United States Patent
Suzuki et al.

[11] Patent Number: 6,152,490
[45] Date of Patent: Nov. 28, 2000

[54] REAR SEAT BELT DEVICE

[75] Inventors: Daisuke Suzuki; Masatake Nagura, both of Hamamatsu, Japan

[73] Assignee: Suzuki Motor Corporation, Shizuoka-ken, Japan

[21] Appl. No.: 09/159,612

[22] Filed: Sep. 24, 1998

[30] Foreign Application Priority Data

Sep. 26, 1997 [JP] Japan ................................. 9-261342

[51] Int. Cl.[7] .................................................. B60R 22/00
[52] U.S. Cl. ............................ 280/801.1; 280/801.2; 280/803; 280/807; 280/808
[58] Field of Search ........................... 280/801.1, 801.2, 280/803, 807, 808

[56] References Cited

U.S. PATENT DOCUMENTS

| | | | |
|---|---|---|---|
| 4,941,683 | 7/1990 | Tabata et al. | 280/807 |
| 4,993,746 | 2/1991 | Hagelthorn | 280/806 |
| 5,244,231 | 9/1993 | Bauer et al. | 280/807 |
| 5,393,091 | 2/1995 | Tanaka et al. | 280/801.1 X |
| 5,397,152 | 3/1995 | Kawamura | 280/807 |
| 5,505,491 | 4/1996 | Townsend | 280/801.1 |
| 5,529,343 | 6/1996 | Klink | 280/801.1 X |
| 5,538,283 | 7/1996 | Townsend | 280/801.1 |
| 5,671,948 | 9/1997 | Susko et al. | 280/801.1 |
| 5,752,719 | 5/1998 | Mitschelen et al. | 280/801.1 |
| 5,924,731 | 7/1999 | Sayles et al. | 280/807 |
| 6,016,985 | 1/2000 | Sung | 280/806 X |

*Primary Examiner*—Lanna Mai
*Assistant Examiner*—Toan C To
*Attorney, Agent, or Firm*—Finnegan, Henderson, Farabow, Garrett, & Dunner, L.L.P.

[57] ABSTRACT

A part 8 of the shoulder anchor tower upwardly protruding from the side body 2 of an open-body type vehicle 1 is formed to have a closed sectional shape by combining the tower inner and outer panels 8a and 8b each other so that a closed sectional shape can be formed. The rear seat belt device is thus obtained, which allows the shoulder anchor tower to have a simpler configuration and a lighter weight, improves the degree of accuracy of assembly, and has reduced cost. The present invention also allows both the passenger room and the rear luggage room to be widened.

3 Claims, 9 Drawing Sheets

OUTER SIDE OF BODY

FORWARD DIRECTION OF BODY

OUTER SIDE OF BODY

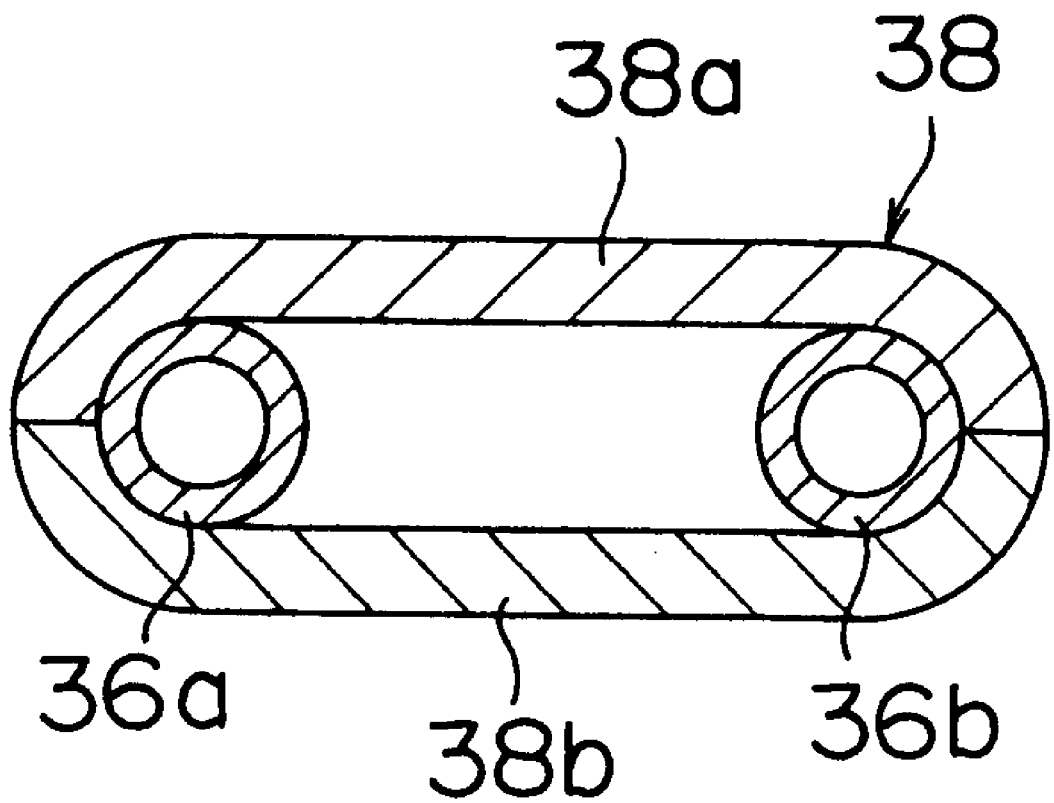

REAR SEAT BELT DEVICE

FIELD OF THE INVENTION AND RELATED ART STATEMENT

The present invention relates to a rear seat belt device for use in an open-body type vehicle.

In the past, in an open-body type vehicle equipped with a lap and diagonal belt device for rear seats, a shoulder anchor tower 31 is vertically mounted, as shown in FIGS. 9 to 11, on the side body 30 of the vehicle, and a sash guide for guiding the seat belt is then fixed on top of the shoulder anchor tower 31, to which also secured, in the lower portion thereof, is a retractor 33 for driving the seat belt end in such a direction as to retract the belt, in such a manner that the seat belt 34 accommodated in the retractor 33 can be extracted through the sash guide 32.

The aforementioned shoulder anchor tower 31 is a member consisting of a base part 35 (its sectional form is shown in FIG. 13) carried against the side body 30 of the vehicle, a pair of legs 36a, 36b formed of pipe material, being mounted vertically on top of the base part 35, and the top head part 37 fixed to the pair of legs, as shown in FIG. 13. The shoulder anchor tower 35 is secured to the side body 30, and both legs 36a, 36b of the anchor tower 31 are so arranged as to protrude upwardly from the top end of the side body 30 (see FIGS. 9 to 11). Consequently, the top head part 37 above the two legs 36a, 36b, and the sash guide 32 fixed to this top head part 37 are disposed in such a manner as to be spaced upwardly from the side body 30. Meanwhile, the inward side face 31a of the shoulder anchor tower 31 is flush with the surface D in the vertical direction, as illustrated in FIG. 14. The top head part is a cap-like member consisting, in combination, of a pair of cover sub-members 38a, 38b of symmetric configuration, as shown in FIG. 15.

Referring now to FIGS. 9 to 11, the retractor 33 is secured to the base part 35, while it is inserted in an opening 39 for housing the retractor formed on the base part 35, in such a way that the seat belt, when extracted from the retractor 33, is routed through the sash guide 32. In FIGS. 10 and 11, numeral 40 represents a rear quarter lower trim to be mounted over the side body 30 to conceal the said base part 35, numeral 41 represents a shoulder anchor cover for enclosing the legs 36a, 36b projecting upwardly from the said body 30 as well as the top head part 37, and numeral 42 represents a side body quarter garnish (see FIG. 10).

In the rear seat belt device, as discussed above, the shoulder anchor tower 31 is composed of five components, namely the body part 35, a pair of legs 36a and 36b made of a pipe material, and a pair of cover members 38a and 38b. This results disadvantageously in the increased number of required components (the number of parts) and complicated structure. In addition, the large number of components in the shoulder anchor tower 31 also leads to problems such as the relatively poor accuracy of assembly and/or the heavier weight. Furthermore, in the rear seat belt device according to the prior art, the rear luggage room in fact cannot be widened, since the shoulder anchor tower 31 is disposed in such a manner as to intrude relatively too much into the luggage room.

OBJECT AND SUMMARY OF THE INVENTION

The present invention is devised in view of the aforementioned problems, and an object of this invention is to provide an improved rear seat belt device which is so constructed as to reduce the number of components of the shoulder anchor tower, thereby allowing the shoulder anchor tower to have a simpler configuration, a lighter weight, and improving the degree of accuracy of assembly. Its costs can be reduced, and the space of both the passenger room and the rear luggage room may be increased.

In order to accomplish the above object, the rear seat belt device according to the present invention has the shoulder anchor tower vertically installed to a side body of an open-body type motor vehicle, the sash guide for guiding the seat belt being secured to the upper part of the shoulder anchor tower, and the retractor for driving the seat belt end in the direction of retraction being disposed in the lower part of the shoulder anchor tower, so that the seat belt accommodated in the retractor is drawn out through the sash guide, wherein the shoulder anchor tower projecting upwardly from the said side body is constructed to have a closed sectional form by combining the tower inner and outer panels with each other to have a closedly joined sectional shape.

In addition, according to the present invention, the said retractor is disposed in a position more outward in the widthwise direction of the vehicle body than the position at which the above sash guide is mounted to the above shoulder anchor tower.

Moreover, according to the present invention, the said retractor is disposed in a position more forward in the lengthwise direction of the vehicle body than the position in which the said sash guide is mounted to the above shoulder anchor tower.

BRIEF DESCRIPTION OF THE DRAWINGS

FIG. 15 is a section view taken along the line N—N in FIG. 12.

DETAILED DESCRIPTION OF PREFERRED EMBODIMENTS

The present invention is now described in detail with respect to an embodiment thereof, in connection with FIGS. 1 to 8.

Figure 1:
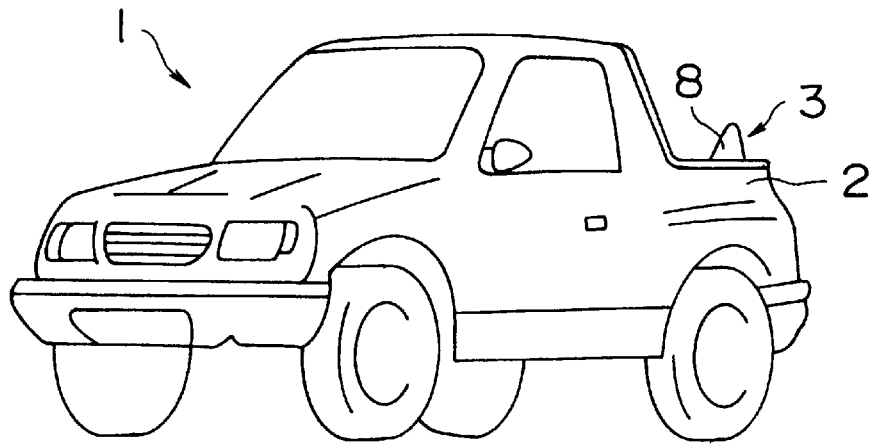
FIG. 1 is a perspective view of an open-body type motor vehicle equipped with a rear seat belt device according to the present invention.
Figure 2:
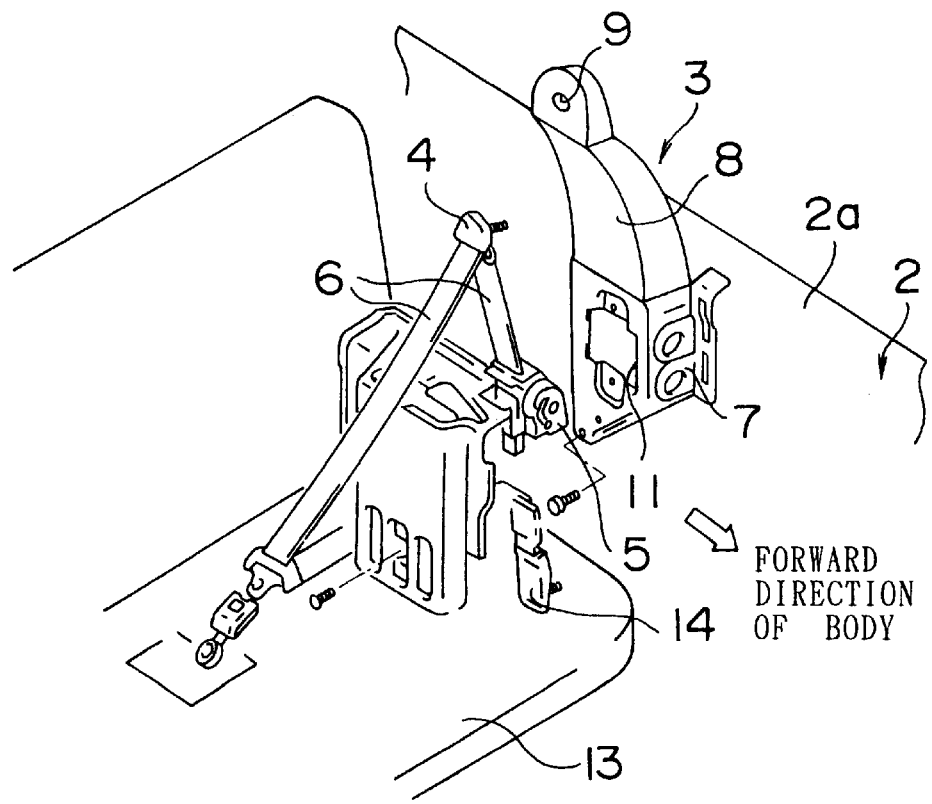
FIG. 2 is an exploded perspective view of the rear seat belt device of FIG. 1.

Referring first to FIG. 1, there is shown an open-body type motor vehicle 1 equipped with the rear seat belt device according to this invention. The shoulder anchor tower 3 is upright installed on the side body 2 of this vehicle 1 in its rear part, i.e. on the rearward side portion in the open room of the open-body type motor car, as illustrated in FIGS. 1 and 2. In FIG. 2, numeral 4 designates the sash guide (shoulder anchor) secured to the upper part of this shoulder anchor tower 3 for guiding the seat belt, numeral 5 designates the retractor fixed to the lower part of the said shoulder anchor tower 3, and numeral 6 designates the seat belt drawn out of this retractor 5 and routed through the said sash guide.

Figure 3:
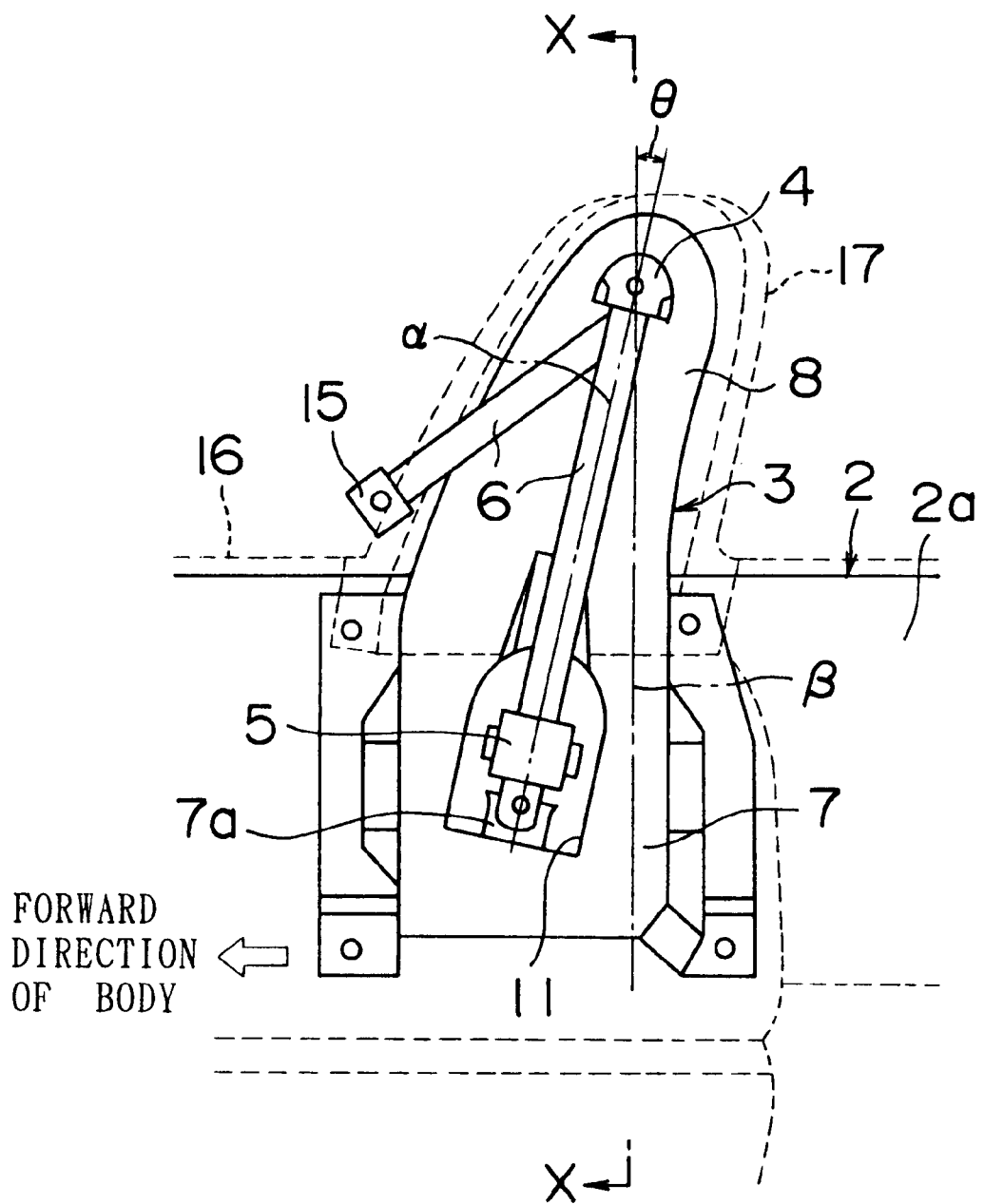
FIG. 3 is a side view of the rear seat belt device of FIG. 1.

The side body 2 described above consists of the side body inner and outer panels 2a and 2b combined with each other to attain a closedly joined sectional form (see FIG. 4), and the shoulder anchor tower 3 is secured to the side body inner panel 2a which defines the inside surface of the side body 2, as illustrated in FIGS. 2 and 3. More specifically, the shoulder anchor tower 3 consists of the base part 7 (its sectional form is shown in FIG. 6) and the shoulder anchor tower part 8 projecting upwardly from this base part 7 (that is, the upper protruding portion of the shoulder anchor tower), wherein the base body 7 is fixed to the inside surface of the side body inner panel 2a by means of bolts or the like, as shown in FIGS. 3 and 5.

Figure 7:
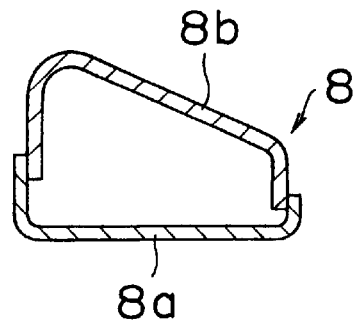
FIG. 7 is a section view taken along the line Z—Z in FIG. 5.

In one embodiment of this invention, the shoulder anchor tower part 8 is so constructed that the tower inner and outer panels 8a and 8b are joined together to provide a closed rectangular sectional form, as shown in FIG. 7, and the shoulder anchor tower part 8 having this closed sectional form is arranged to protrude upwardly from the top end of the side body 2 so as to provide a leg for holding the sash guide on it. The bolt through hole 9 provided on the upper portion of the shoulder anchor tower part 8 is used together with the weld nut 10 to secure the sash guide 4. Meanwhile, the shoulder anchor tower part 8 is formed in such a manner that the shoulder anchor tower 3 extends in the direction which bends backward with respect to the base part 7, when viewed in the width direction of the vehicle body, as illustrated in FIG. 3, so that the direction α of extension of the shoulder anchor tower part 8 is inclined by the angle θ backward with respect to the vertical direction β of the base part 7.

Figure 4:
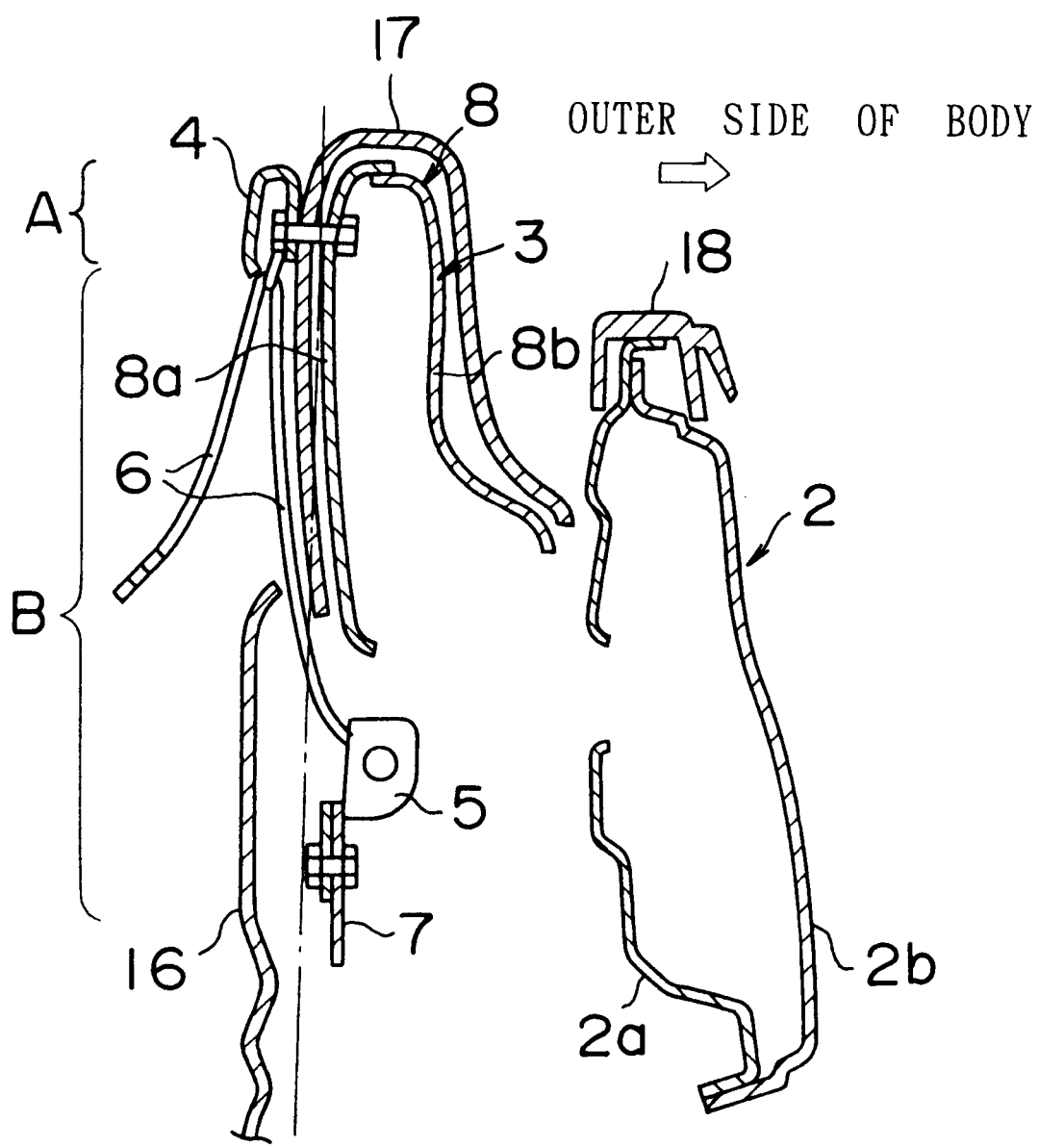
FIG. 4 is a section view taken along the line X—X in FIG. 3.
Figure 5:
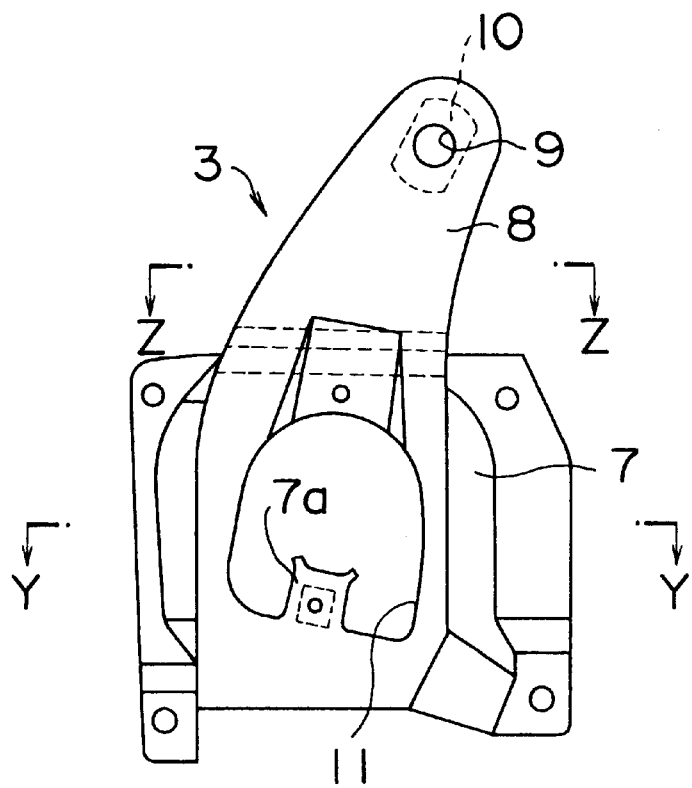
FIG. 5 is a side view of the shoulder anchor tower according to the present invention, as seen in the transverse direction of the vehicle body.
Figure 6:
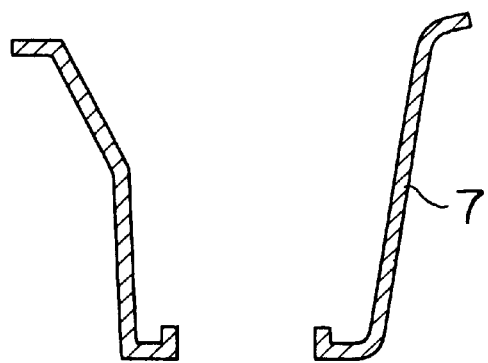
FIG. 6 is a section view taken along the line Y—Y in FIG. 5.
Figure 8:
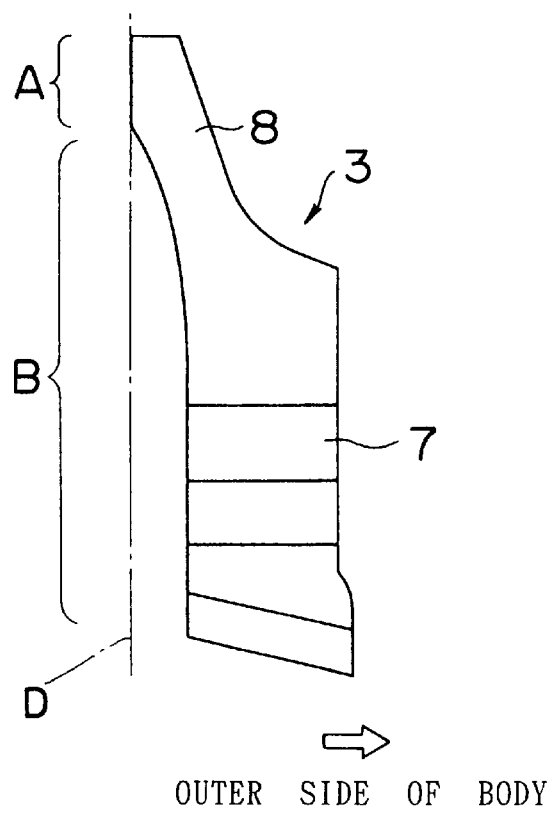
FIG. 8 is a front view of the shoulder anchor tower for use in the aforementioned seat belt device, as seen from the front of the vehicle body.
Figure 9:
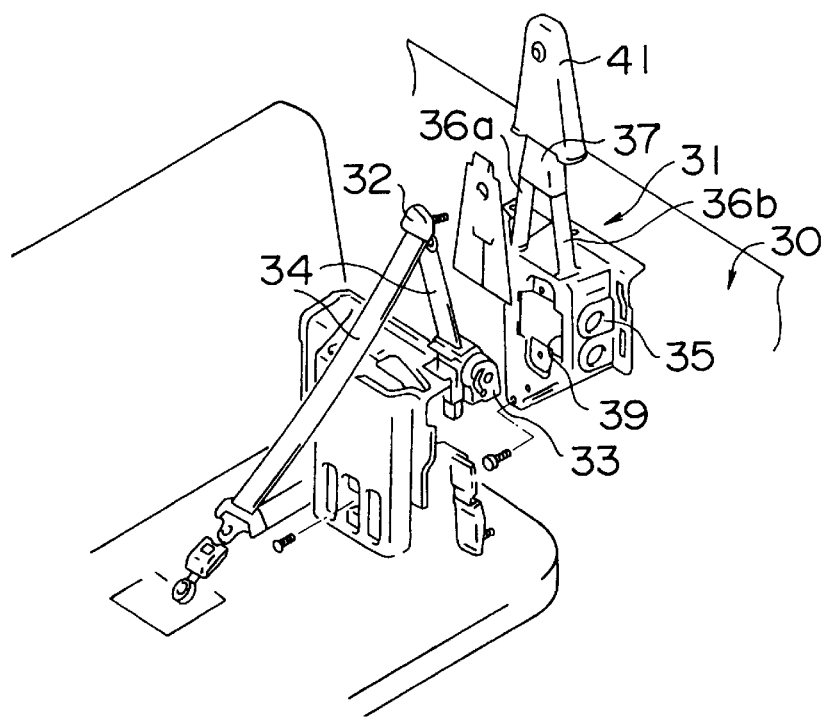
FIG. 9 is an exploded perspective view showing a prior art seat belt device.
Figure 10:
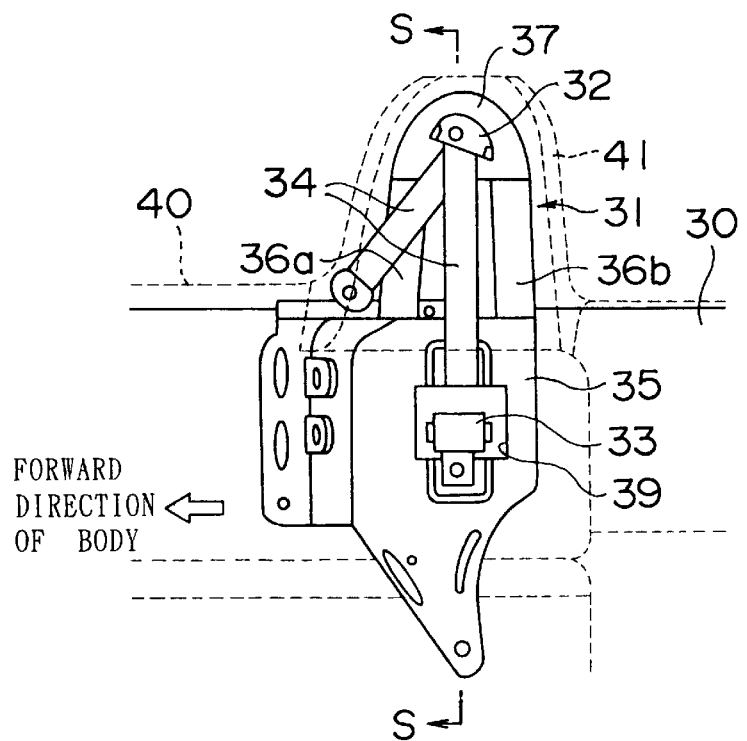
FIG. 10 is a section view of the prior art seat belt device.
Figure 11:
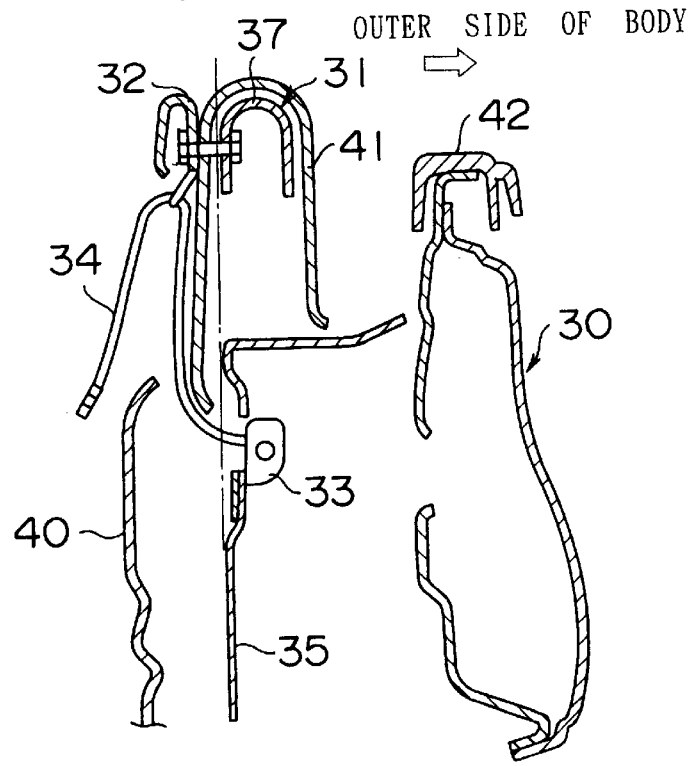
FIG. 11 is a section view taken along the line S—S in FIG. 10.
Figure 12:
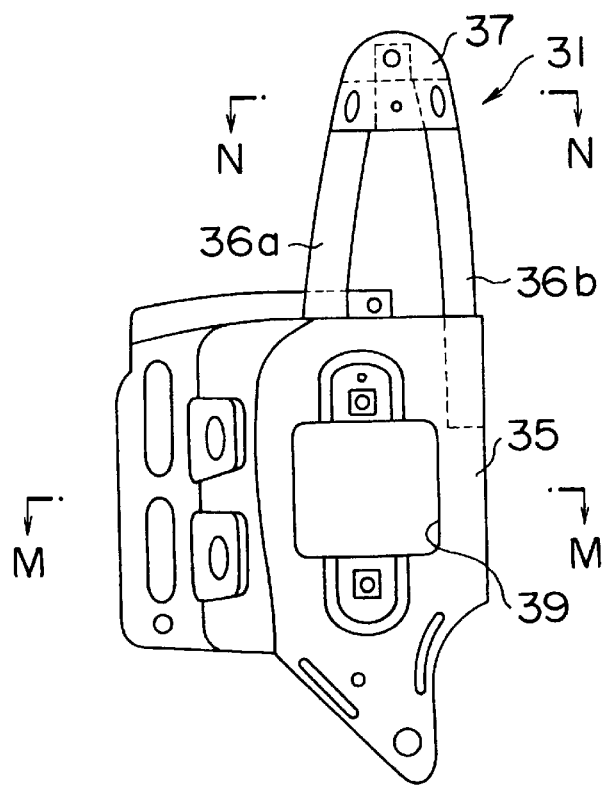
FIG. 12 is a section view of the shoulder anchor tower for use in the prior art seat belt device.
Figure 13:
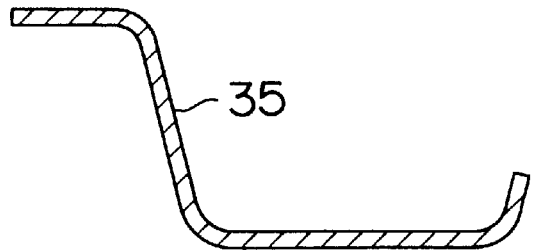
FIG. 13 is a section view taken along the line M—M in FIG. 12.
Figure 14:
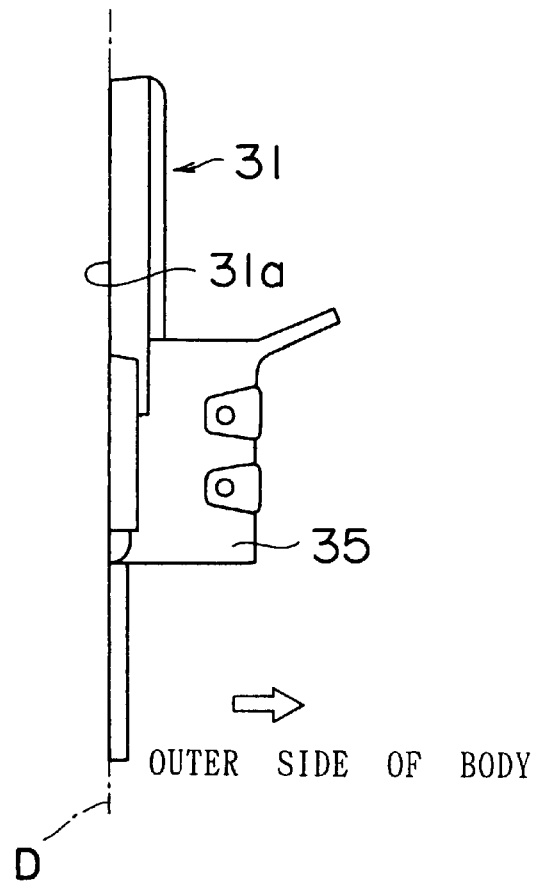
FIG. 14 is a front view of the shoulder anchor tower for use in the prior art seat belt, as seen from the front of the vehicle body.

Referring now to FIGS. 3 and 5, the shoulder anchor tower 3 has an opening 11 in the lower portion thereof or the central portion of the base body 7, and the retractor 5 is bolted to the attachment 7a on the base part 7, with the retractor 5 housed within the opening 11. Thus, the position at which the sash guide 4 is secured to the shoulder anchor tower 3 is spaced in the lengthwise direction of the vehicle body from the position at which the retractor 5 is fixed to the shoulder anchor tower 3, in such a manner that the retractor mounting position deviates forward from the sash guide mounting position (see FIG. 3). In addition, when viewed from the front of the vehicle body, the top portion of the shoulder anchor tower 3, or the position A in which the sash guide 4 is mounted, deviates inward from the portion below the position A, or the lower position B, as illustrated in FIGS. 4 and 8, so that the mounting position of the retractor 5 to the shoulder anchor tower part 8 is more outward in the width direction of the vehicle body than the position at which the sash guide 4 is mounted.

The seat belt drawn out of the retractor is then passed through the sash guide 4, and the leading end of the belt is secured via the anchor plate 14 to the lower part of the side body 2 opposite the side edge of the rear seat 13, as depicted in FIG. 2, or via the anchor plate 15 at the top end portion of the side body 2, as shown in FIG. 3. On the other hand, other constructions may be similar to those of the prior art. For example, the rear quarter lower trim 16 is mounted onto the side body inner panel 2a to conceal the base part 7, while the shoulder anchor cover 17 is mounted to enclose the shoulder anchor tower part 8 which projects upwardly from the side body 2, as shown in FIGS. 3 and 4. Meanwhile, numeral 18 in FIG. 4 designates the side body quarter garnish.

In the resulting rear seat belt device, the shoulder anchor tower part 8 upwardly protruding from the side body 2 is composed of just two members: the tower inner and outer panels 8a and 8b, so that the number of components can be reduced. Consequently, its configuration can be simplified, and its weight can be reduced. Furthermore, accuracy of assembly (dimensional accuracy) can increase thanks to the reduction of the number of components.

Moreover, as shown in FIG. 3, the direction of extension of the shoulder anchor tower part 8 is so constructed as to incline backwardly (by the angle θ) with respect to the vertical direction β of the base part 7, thereby the mounting position of the retractor 5 deviates longitudinally in the forward direction with respect to the mounting position of the sash guide 4, and accordingly, the space of the luggage room at the back of the shoulder anchor tower 3 can be increased in the lengthwise direction. In addition, the lower part B of the shoulder anchor tower 3 is more widely spaced in the outward direction than the sash guide mounting position A with respect to the vertical surface D of the vehicle body which includes the sash guide mounting surface, thereby the space of the passenger room can be increased in the width direction of the vehicle body.

Although the present invention has been described with reference to a specific embodiment, it is not intended to limit the invention. Various changes and modifications may be conceived based on the technical idea of the present invention. For example, the shape of each part of the shoulder anchor tower 3 may be modified as needed, and/or the construction for mounting the sash guide 4 and/or the retractor 5 to the shoulder anchor tower 3 may be changed variously.

As aforementioned, the present invention provides the shoulder anchor tower part which protrudes upwardly from the side body, characterized in that it is composed of the tower inner and outer panels combined with each other in such a manner as to provide a closed sectional form, thereby rendering the shoulder anchor tower part having the closed sectional form. Thus, the shoulder anchor tower part is composed of just two components: tower inner and out panels. Accordingly, the number of components and steps of assembling process can be reduced, whereby simplification, reduced weight, higher degree of accuracy of assembly (dimensional accuracy), and cost reduction in manufacturing the shoulder anchor tower can be realized.

The present invention also allows the passenger room to be widened to the degree the retractor mounting position is moved transversely in the outward direction, because the retractor mounting position is transversely (or widthwise) more spaced in the outward direction than the sash guide mounting position on the shoulder anchor tower.

Furthermore, the present invention allows the luggage room at the back of the retractor mounting position to be widened to the extent that the retractor mounting position is moved longitudinally in the backward direction, because the retractor mounting position is longitudinally more spaced in the backward direction than the sash guide mounting position on the shoulder anchor tower.

What is claimed is:

1. A rear seat belt device attachment structure for an open-body type vehicle having a side body, the attachment structure comprising:

a shoulder anchor tower having an upper portion and a lower portion, for vertical attachment to the side body;

a sash guide for guiding a seat belt secured to the upper portion of the shoulder anchor tower; and a retractor disposed in the lower part of the shoulder anchor tower, for driving one end of the seat belt in a retracting direction, wherein the seat belt accommodated in the retractor is drawn out through said sash guide, and wherein the shoulder anchor tower projects upwardly from said side body and has tower inner and outer panels closely combined with each other so as to have a closed sectional shape.

2. The rear seat belt device attachment structure according to claim 1, wherein said retractor is mounted in a position transversely more spaced in an outward direction of the side body than a position at which said sash guide is mounted to said shoulder anchor tower.

3. The rear seat belt device attachment structure according to claim 1 or 2, wherein said retractor is mounted in a position lengthwise more spaced in a forward direction of the side body than a position at which said sash guide is mounted to said shoulder anchor tower.

* * * * *

UNITED STATES PATENT AND TRADEMARK OFFICE
CERTIFICATE OF CORRECTION

PATENT NO. : 6,152,490  
DATED : November 28, 2000  
INVENTOR(S) : Daisuke Suzuki et al.

Page 1 of 1

It is certified that error appears in the above-identified patent and that said Letters Patent is hereby corrected as shown below:

<u>Title page,</u>  
Item [54], in the Title, after "DEVICE", insert -- ATTACHMENT STRUCTURE --.

Item [57], ABSTRACT, line 4, before "each other", insert -- with --.

Signed and Sealed this

Fifth Day of March, 2002

Attest:

JAMES E. ROGAN  
*Attesting Officer*     *Director of the United States Patent and Trademark Office*